United States Patent
Kupferman

(10) Patent No.: US 7,333,290 B1
(45) Date of Patent: Feb. 19, 2008

(54) MAGNETIC DISK IN A DISK DRIVE AND METHOD HAVING IMPROVED NULL SERVO BURST PHASING

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/499,836

(22) Filed: Aug. 3, 2006

(51) Int. Cl.
*G11B 5/596* (2006.01)
*G11B 5/09* (2006.01)

(52) U.S. Cl. .................................. 360/77.08; 360/48
(58) Field of Classification Search ............ None
See application file for complete search history.

(56) References Cited

U.S. PATENT DOCUMENTS

| | | | |
|---|---|---|---|
| 5,808,971 | A | 9/1998 | Alini et al. |
| 5,917,670 | A | 6/1999 | Scaramuzzo et al. |
| 6,108,153 | A | 8/2000 | Glover |
| 6,147,825 | A | 11/2000 | Alini et al. |
| 6,307,696 | B1 | 10/2001 | Bishop et al. |
| 6,426,845 | B1 * | 7/2002 | Sacks et al. ............ 360/77.08 |
| 6,515,892 | B1 | 2/2003 | Itoh et al. |
| 6,594,094 | B2 | 7/2003 | Rae et al. |
| 6,760,173 | B2 | 7/2004 | Kuki et al. |
| 2003/0058562 | A1 | 3/2003 | Kuki et al. |

FOREIGN PATENT DOCUMENTS

| | | |
|---|---|---|
| EP | 0 828 242 A1 | 3/1998 |
| WO | WO 98/16918 A1 | 4/1998 |
| WO | WO 00/63904 A1 | 10/2000 |
| WO | WO 01/80238 A1 | 10/2001 |

* cited by examiner

*Primary Examiner*—Andrew L. Sniezek
(74) *Attorney, Agent, or Firm*—Brian E. Jones, Esq.; Robroy R. Fawcett, Esq.

(57) ABSTRACT

Disclosed is a magnetic disk having servo sectors for defining data tracks. Each servo sector includes a preamble field and a null servo burst field. The preamble field is for synchronizing a phase-locked loop oscillator and defines a reference phase angle. The null servo burst field includes first and second servo bursts that are radially adjacent and have opposed phase angles such that a read along a null path that is equally between the first and second servo bursts generates a read signal of substantially zero amplitude, and a read along a path that is offset from the null path generates a read signal having an amplitude indicating a distance between the offset path and the null path, and having a phase indicating an offset direction. Further, the phase angle of the first and second servo bursts are substantially different from the reference phase angle.

15 Claims, 4 Drawing Sheets

MAGNETIC DISK IN A DISK DRIVE AND METHOD HAVING IMPROVED NULL SERVO BURST PHASING

BACKGROUND OF THE INVENTION

1. Field of the Invention

The present invention relates to disk drives, and more particularly, to a technique for generating head position information using improved null servo burst phasing in a disk drive.

2. Description of the Prior Art and Related Information

In order to remain competitive, disk drive manufacturers must continually provide increased data storage capacity while rigidly controlling disk drive manufacturing cost. One key to increased storage capacity is increased track density, often expressed as tracks per inch or TPI. Market demand for increased storage capacity has pushed disk drive designers to increase the TPI of disk drives, thereby increasing the demands for accurate determination of the position of the disk drive's read/write head in disk operations.

Accordingly, there exists a need for a technique that more reliably determines a head's position in a disk drive without unnecessarily impacting the disk drive's storage capacity or increasing the disk drive's manufacturing cost.

SUMMARY OF THE INVENTION

The present invention may be embodied in a magnetic disk, of a disk drive, having servo sectors for defining data tracks on the magnetic disk. Each servo sector includes a preamble field and a null servo burst field. The preamble field is for synchronizing a phase-locked oscillator during a servo sector read operation, and defines a reference phase angle. The null servo burst field includes first and second servo bursts that are radially adjacent and have opposed phase angles such that a read along a null path that is equally between the first and second servo bursts generates a read signal of substantially zero amplitude, and a read along a path that is offset from the null path generates a read signal having an amplitude indicating a distance between the offset path and the null path, and having a phase indicating an offset direction. Further, the phase angle of the first servo burst is substantially different from the reference phase angle, and the phase angle of the second servo burst is substantially different from the reference phase angle.

In more detailed features of the invention, the reference phase angle may have a value of about zero degrees, the phase angle of the first servo burst may have a value of about 90 degrees, and the phase angle of the second servo burst may have a value of about 270 degrees. Alternatively, a phase difference between the reference phase angle and the phase angle of the first servo burst may be at least 5 degrees, or at least 10 degrees. Also, a phase difference between the phase angles of the first and second servo bursts may be about 180 degrees.

The present invention also may be embodied in a method for generating head position information during track following in a disk drive including a magnetic disk having servo sectors for defining data tracks on the magnetic disk. Each servo sector includes a preamble field and a null servo burst field. The preamble field is for synchronizing a phase-locked oscillator during a servo sector read operation, and defines a reference phase angle. The null servo burst field includes first and second servo bursts that are radially adjacent and have opposed phase angles such that a read along a null path that is equally between the first and second servo bursts generates a read signal of substantially zero amplitude, and a read along a path that is offset from the null path generates a read signal having an amplitude indicating a distance between the offset path and the null path, and having a phase indicating an offset direction. Further, the phase angle of the first servo burst is substantially different from the reference phase angle, and the phase angle of the second servo burst is substantially different from the reference phase angle. The method comprises locking onto the reference phase angle of the preamble field, generating a read signal as a head traverses a path through the null servo burst field, the read signal having an amplitude and a phase angle, and generating a servo position signal based on the read signal generated as the head traverses the path through the null servo burst field.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
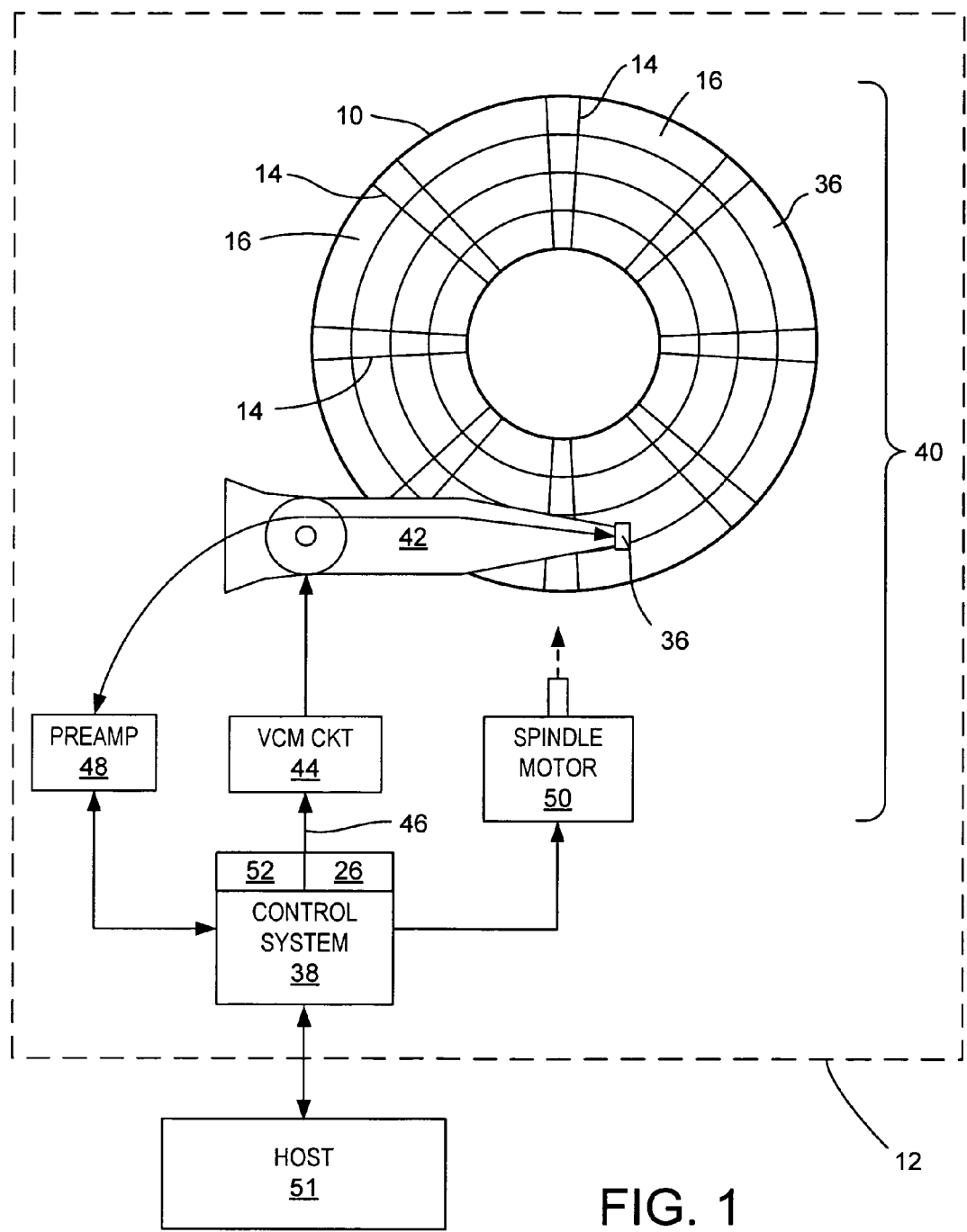
FIG. 1 is a block diagram of a disk drive including a magnetic disk having improved null servo burst phasing, according to the present invention.
Figure 2:
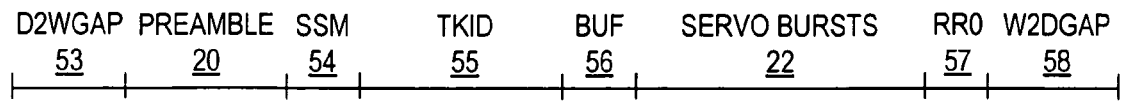
FIG. 2 is a data structure of a typical servo sector providing track identification and track position information.
Figure 3:
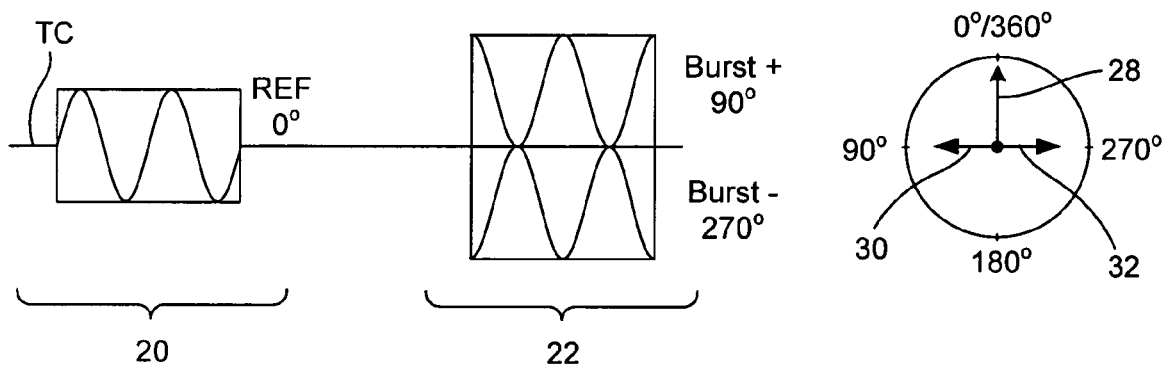
FIG. 3 is a schematic diagram showing the relative phasing of a preamble field and null servo bursts, according to the present invention.

With reference to FIGS. 1 through 3, the present invention may be embodied in a magnetic disk 10, of a disk drive 12 (FIG. 1), having servo sectors 14 for defining data tracks 16 on the magnetic disk. Each servo sector includes a preamble field 20 and a null servo burst field 22 (FIGS. 2 and 3). The preamble field is for synchronizing a phase-locked oscillator 26 during a servo sector read operation, and defines a reference phase angle 28. The null servo burst field includes first and second servo bursts (+ and −) that are radially adjacent and have opposed phase angles, 30 and 32, such that a read along a null path that is equally between the first and second servo bursts generates a read signal of substantially zero amplitude, and a read along a path that is offset from the null path generates a read signal having an amplitude indicating a distance between the offset path and the null path, and having a phase indicating an offset direction. Further, the phase angle of the first servo burst is substantially different from the reference phase angle, and the phase angle of the second servo burst is substantially different from the reference phase angle.

Figure 4:
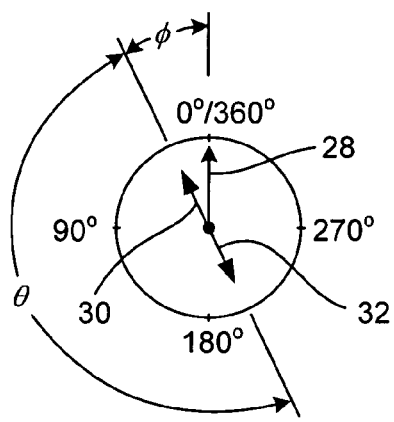
FIG. 4 is another diagram showing the relative phasing of a preamble field and null servo bursts, according to the present invention.

Advantageously, the reference phase angle 28 may have a value of about zero degrees, the phase angle 30 of the first servo burst may have a value of about 90 degrees, and the phase angle 32 of the second servo burst may have a value of about 270 degrees. Alternatively, as shown in FIG. 4, a phase difference φ between the reference phase angle 28 and the phase angle 32 of the first servo burst may be at least 5 degrees, or at least 10 degrees. Also, a phase difference θ between the phase angles, 30 and 32, of the first and second servo bursts may be about 180 degrees.

Figure 5:
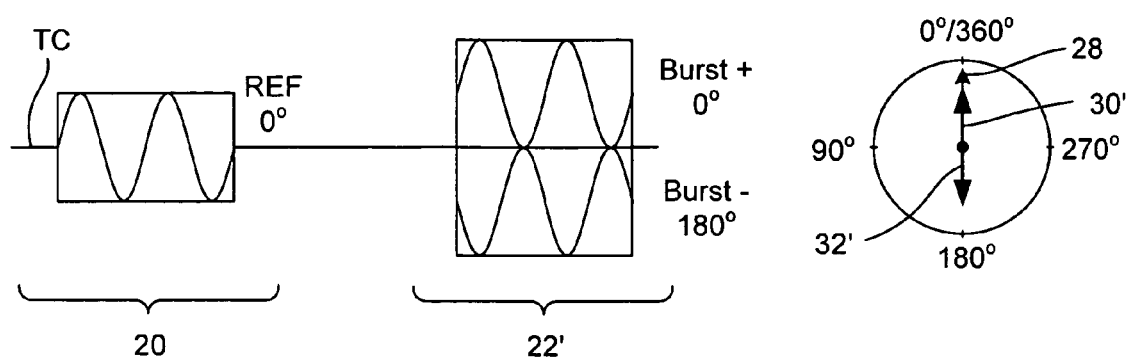
FIG. 5 is a schematic diagram showing a typical relative phasing of a preamble field and null servo bursts, which may be induce disruptive behavior during track following.

The phase angles, 30 and 32, of the first and second servo bursts should sufficiently different from the zero degrees to avoid disruptive instabilities or errors that may be induced in a servo control algorithm as a measured phase angle changes, for example, from 359 degrees to 0 or 1 degrees. When the reference phase angle 28 and the phase angle of the first servo burst 30' are 0 degrees, as shown in FIG. 5, then disruptive behaviors or instabilities may be induced in the servo control algorithm, or implementing hardware, as the measured phase angle changes from 359 to 0 degrees, or the like. Such problems may be avoided by assigning the reference phase angle to 0 degrees, and by using a 90 degree offset between the reference phase angle 28 and each of the respective phase angles, 30 and 32, of the servo bursts.

Figure 6:
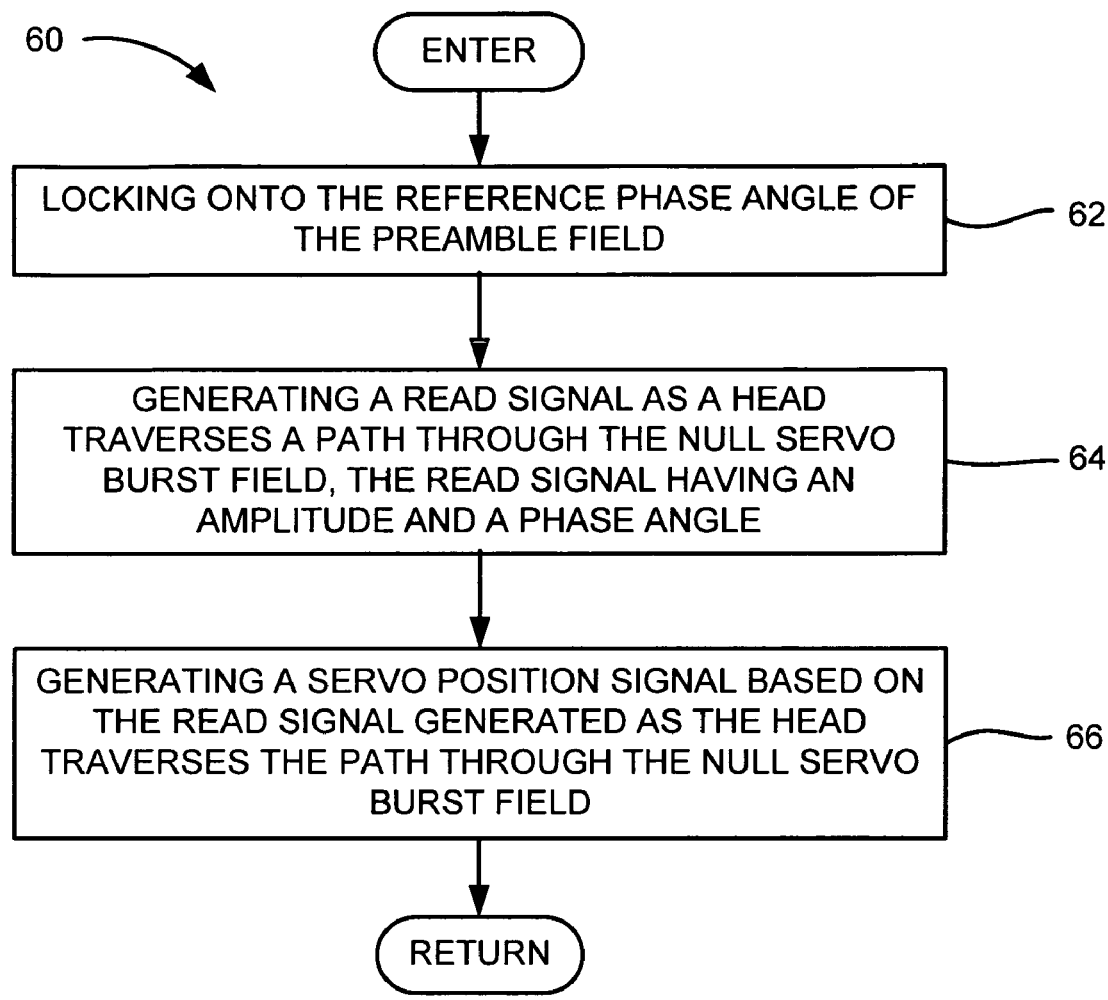
FIG. 6 is a flow diagram illustrating an embodiment of a method for generating head position information using improved null servo burst phasing, according to the present invention.

With reference to FIG. 6, the present invention also may be embodied in a method 60 for generating head position information during track following in the disk drive 12 of FIG. 1. The method comprises locking onto the reference phase angle 28 of the preamble field 20 (step 62), generating a read signal as a head 36 traverses a path through the null servo burst field 22 (step 64), the read signal having an amplitude and a phase angle, and generating a servo position signal based on the read signal generated as the head traverses the path through the null servo burst field (step 66).

The disk drive 12 generally comprises a disk control system 38 and a head disk assembly (HDA) 40. The HDA includes the magnetic disk 10 having the plurality of concentric data tracks 16 recorded thereon, the head or transducer 36 for writing user data to or reading user data from a selected one of the data tracks in response to a host command, and an actuator 42 for positioning the transducer over the selected track. The transducer 36 may comprise a thin film inductive write element and a read element, which in present disk drives typically comprises a giant magneto-resistive (GMR) read element. The actuator is typically implemented as a voice coil motor (VCM) circuit 44 which rotates an actuator arm about a pivot in order to position the head radially over the disk in response to control signals 46 from the disk control system. The HDA 40 also includes a preamplifier 48, and a spindle motor 50 for rotating the disk. The head communicates with the disk control system 38 via the preamplifier. The disk control system includes a servo control system 52 that controls the head's position over the disk 10. The servo control system reads track identification information and track position information from a servo sector 14 and uses that information to generate the control signals 46. The disk control system 38 and also includes circuitry and processors that provide an intelligent disk control system interface between a host 51 and the HDA for execution of read and write commands. The disk control system may have, for example, an internal microprocessor and nonvolatile memory. Program code for implementing the techniques of the invention may be stored in the nonvolatile memory and transferred to volatile random access memory (RAM) for execution by the microprocessor. The microprocessor and supporting hardware of the disk drive comprise the means for implementing the functions of the disk drive of the present invention.

The servo control system 52 implements a servo control loop which causes the head 36 to follow a desired path (or centerline) of the selected track 16 in an operation generally referred to as "track following." During track following, the path of the head wanders about the desired track path. Typically, the servo control system attempts to limit the head wander to within a predetermined range defined by a "Track Misregistration" (TMR) budget.

A track 16 is selected for track following by applying the reference position corresponding to the selected track at an input of the servo control loop. A position error signal (PES) is generated based on the difference between the reference position and the actual transducer position, which is measured as the head 36 passes over a servo sector 14 of the selected track. Nominally, a track following compensator of the servo control system 52 processes the PES and generates the control signal 46 for application to the HDA 40.

FIG. 2 conceptually presents the servo information that may be written in a servo sector 14, but the relative dimensions of the component fields are not drawn to scale. As shown, each servo sector contains a sequence of fields having various functions relative to locating and reading the servo information and implementing the servo control process. More particularly, each servo sector 14 generally comprises a header region (not separately identified) followed by the null servo burst field 22.

The header region fields include a data-to-wedge gap (D2WGAP) (or write splice) field 53, the preamble field 20 which may have an address mark field and an automatic-gain-control/phase-locked-loop (AGC/PLL) field, a servo sync mark (SSM) field 54, a track identification (TKID) field 55, and a buffer (BUF) field 56. The header region is followed by the servo bursts (+ and −) that are radially offset relative to a burst pair centerline. After the null servo burst field 22 is a repeatable runout (RRO) field 57, and a wedge-to-data gap (W2DGAP) field 58.

The data-to-wedge gap D2WGAP field 53 provides a buffer zone to prevent the servo control system 52 from interpreting an erasure within a preceding user data segment as an address mark field. The preamble field 20 provides a stable reference to set the gain of a read channel and "train" the phase lock oscillator 26 to lock on the servo channel frequency. The servo sync mark SSM field 54 provides a unique coded word which synchronizes decoding logic in the disk drive's read channel (not shown) to either byte or word timing boundaries. The track identification TKID field 55 provides a binary coded track address that uniquely identifies an integer servo track position for coarsely moving the head 36 to a desired servo track 16 ("seeking"). The TKID field conventionally uses a gray code to allow for reading track identification fields while sweeping across multiple servo tracks during seek operations. The buffer field 56 provides space between the TKID field 55 and the null servo burst field 22. The servo bursts (+ and −) provide the servo control system 52 with information needed to determine a fractional track position for keeping the transducer at a desired position relative to a track centerline TC ("track following"). Regarding the designation of bursts as + and −, the burst designation is arbitrary and may vary from manufacturer to manufacturer. The track centerlines are defined relative to burst pairs.

What is claimed is:

1. A magnetic disk having servo sectors for defining data tracks on the magnetic disk, each servo sector comprising:
   a preamble field for synchronizing a phase-locked oscillator during a servo sector read operation, wherein the preamble field defines a reference phase angle, and
   a null servo burst field comprising first and second servo bursts, wherein:
   the first and second servo bursts are radially adjacent and have opposed phase angles such that a read along a null path that is equally between the first and second servo bursts generates a read signal of substantially zero amplitude, and a read along a path that is offset from the null path generates a read signal having an amplitude indicating a distance between the offset path and the null path, and having a phase indicating an offset direction, the phase angle of the first servo burst is substantially different from the reference phase angle, and the phase angle of the second servo burst is substantially different from the reference phase angle.

2. A magnetic disk as defined in claim 1, wherein:

the reference phase angle has a value of about zero degrees;

the phase angle of the first servo burst has a value of about 90 degrees; and the phase angle of the second servo burst has a value of about 270 degrees.

3. A magnetic disk as defined in claim 1, wherein a phase difference between the reference phase angle and the phase angle of the first servo burst is at least 5 degrees.

4. A magnetic disk as defined in claim 1, wherein a phase difference between the reference phase angle and the phase angle of the first servo burst is at least 10 degrees.

5. A magnetic disk as defined in claim 1, wherein a phase difference between the phase angles of the first and second servo bursts is about 180 degrees.

6. A disk drive comprising:

a magnetic disk having servo sectors for defining data tracks on the magnetic disk, each servo sector comprising:

a preamble field for synchronizing a phase-locked oscillator during a servo sector read operation, wherein the preamble field defines a reference phase angle, and a null servo burst field comprising first and second servo bursts, wherein:

the first and second servo bursts are radially adjacent and have opposed phase angles such that a read along a null path that is equally between the first and second servo bursts generates a read signal of substantially zero amplitude, and a read along a path that is offset from the null path generates a read signal having an amplitude indicating a distance between the offset path and the null path, and having a phase indicating an offset direction, the phase angle of the first servo burst is substantially different from the reference phase angle, and the phase angle of the second servo burst is substantially different from the reference phase angle.

7. A disk drive as defined in claim 6, wherein:

the reference phase angle has a value of about zero degrees;

the phase angle of the first servo burst has a value of about 90 degrees; and the phase angle of the second servo burst has a value of about 270 degrees.

8. A disk drive as defined in claim 6, wherein a phase difference between the reference phase angle and the phase angle of the first servo burst is at least 5 degrees.

9. A disk drive as defined in claim 6, wherein a phase difference between the reference phase angle and the phase angle of the first servo burst is at least 10 degrees.

10. A disk drive as defined in claim 6, wherein a phase difference between the phase angles of the first and second servo bursts is about 180 degrees.

11. A method for generating head position information during track following in a disk drive including a magnetic disk having servo sectors for defining data tracks on the magnetic disk, each servo sector including a preamble field for synchronizing a phase-locked oscillator during a servo sector read operation, and the preamble field defining a reference phase angle, the method comprising locking onto the reference phase angle of the preamble field;

generating a read signal as a head traverses a path through a null servo burst field, the read signal having an amplitude and a phase angle, and the null servo burst field comprising first and second servo bursts, wherein the first and second servo bursts are radially adjacent and have opposed phase angles such that a read along a null path that is equally between the first and second servo bursts generates a read signal of substantially zero amplitude, and a read along a path that is offset from the null path generates a read signal having an amplitude indicating a distance between the offset path and the null path, and having a phase indicating an offset direction, the phase angle of the first servo burst is substantially different from the reference phase angle, and the phase angle of the second servo burst is substantially different from the reference phase angle; and generating a servo position signal based on the read signal generated as the head traverses the path through the null servo burst field.

12. A method as defined in claim 11, wherein:

the reference phase angle has a value of about zero degrees;

the phase angle of the first servo burst has a value of about 90 degrees; and the phase angle of the second servo burst has a value of about 270 degrees.

13. A method as defined in claim 11, wherein a phase difference between the reference phase angle and the phase angle of the first servo burst is at least 5 degrees.

14. A method as defined in claim 11, wherein a phase difference between the reference phase angle and the phase angle of the first servo burst is at least 10 degrees.

15. A method as defined in claim 11, wherein a phase difference between the phase angles of the first and second servo bursts is about 180 degrees.

* * * * *